United States Patent [19]
Wakeman et al.

[11] 3,805,966
[45] Apr. 23, 1974

[54] DISPLAY RACK

[75] Inventors: Harold R. Wakeman, 300 Dalkeith Ave., Los Angeles, Calif. 90049; Laurence E. Hiney, Los Angeles, Calif.

[73] Assignee: said Wakeman, by said Hiney

[22] Filed: Jan. 20, 1972

[21] Appl. No.: 219,293

[52] U.S. Cl. .................................. 211/182, 211/175
[51] Int. Cl. .............................................. A47f 5/10
[58] Field of Search ..................... 211/182, 175, 162; 248/460, 469, 298, 165, 441, 243; 40/125 H, 78; 287/49

[56] References Cited
UNITED STATES PATENTS

| | | | |
|---|---|---|---|
| 1,282,557 | 10/1918 | Feldtkeller | 211/175 |
| 1,556,624 | 10/1925 | Pavenick | 211/178 R |
| 2,567,659 | 9/1951 | Valenta | 287/49 X |
| 2,760,647 | 8/1956 | Saul | 211/182 X |
| 3,338,422 | 8/1967 | Hickok | 211/178 R |

FOREIGN PATENTS OR APPLICATIONS

| | | | |
|---|---|---|---|
| 503,797 | 6/1951 | Belgium | 211/182 |
| 997,482 | 7/1965 | Great Britain | 211/182 |
| 480,828 | 12/1969 | Switzerland | 211/178 R |

Primary Examiner—Ramon S. Britts
Attorney, Agent, or Firm—Harris, Kern, Wallen & Tinsley

[57] ABSTRACT

A display rack assembly for paintings, or other articles, comprising A-frame display racks interconnected for relative pivotal movement about vertical axes so that the assembly can be set up in indoor or outdoor areas of various shapes and sizes. The display racks, and the various components thereof, are so interconnected that the entire assembly can be set up and taken down very quickly and easily, thereby making it possible to use the assembly for temporary displays.

8 Claims, 10 Drawing Figures

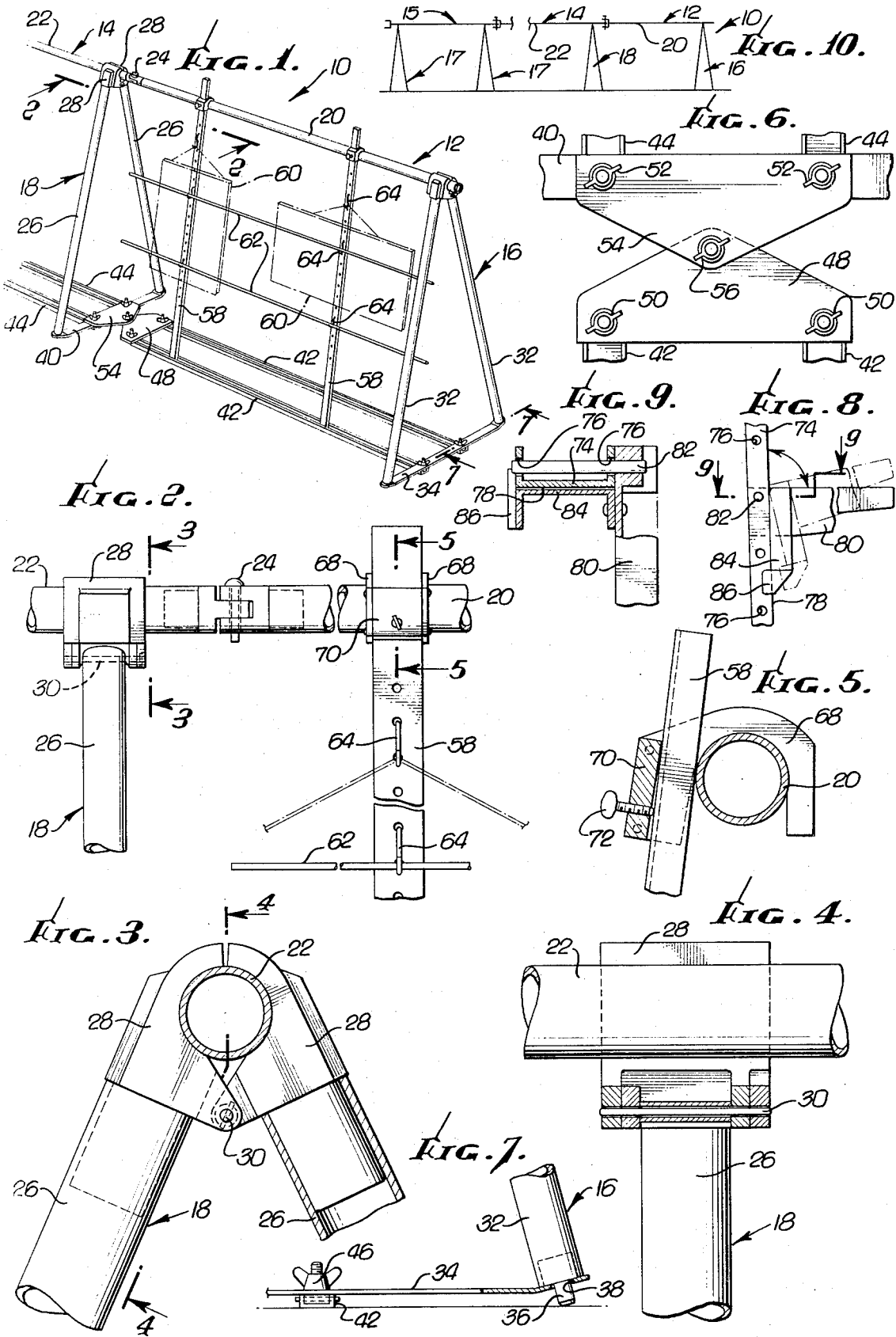

3,805,966

DISPLAY RACK

BACKGROUND OF INVENTION

The present invention relates in general to a display rack and, more particularly, to a display rack assembly composed of a series of individual racks connected end to end.

While the display rack assembly of the invention may be utilized for other purposes, it is particularly useful for displaying paintings at exhibitions, or the like, and will be considered in such connection herein for convenience, with the understanding that the invention may be utilized for other purposes as well.

SUMMARY AND OBJECTS OF INVENTION

Primary objects of the invention are to provide a display rack assembly which can be set up and taken down quickly and easily and which will fit into spaces of various shapes and/or sizes.

More particularly, an important object of the invention is to provide a display rack assembly which includes individual display racks interconnected in end-to-end relation for relative pivotal movement about vertical axes. With this construction, the display racks may be arranged in alignment, at angles to each other, or a combination of the two, depending on the size and shape of the display area available, which is an important feature.

Another important object is to provide a display rack assembly wherein the racks themselves, and their components, may be assembled and disassembled quickly and easily so that the rack assembly may be set up and taken down in very short periods of time by either men or women.

More particularly, an important object is to provide a display rack which includes an A-frame having ridge and base members extending longitudinally therefrom and adapted to be connected to corresponding ridge and base members of a second display rack of the invention in such a way as to permit relative pivotal movement of the two racks about a vertical axis. Consequently, the racks may be arranged in alignment, or at different angles to each other, depending on the space available.

Another object of the invention is to provide a rack wherein the A-frame includes upwardly converging posts pivotally interconnected below their upper ends and having at their upper ends clamps engageable with the ridge member upon spreading of the lower ends of the posts. This construction permits quick and easy assembly and disassembly of the A-frame and the ridge member.

Still another object is to provide an A-frame wherein the lower ends of the posts are simply plugged into the ends of a link which maintains the desired spacing between the lower ends of the posts.

Yet another object is to provide a display rack wherein two longitudinally extending base members have ends connected to the A-frame link and have their other ends pivotally connected to the next rack in the series by a vertical pivot means coaxial with a vertical pivot means interconnecting the ridge members of the two racks.

Another object is to provide a construction wherein the base members of each rack are upwardly facing channels adapted to have seated therein the lower ends of display columns carrying paintings, or other articles, to be displayed.

A further object is to provide an adjustable connecting means, for connecting the upper end of each display column to the corresponding ridge member, which includes: two spaced hooks in hooked engagement with the ridge member; a spacer spaced from the ridge member and interconnecting the hooks; the display column being disposed between the spacer and the ridge member and also being disposed between the hooks; and a set screw threaded through the spacer and bearing against the display column and adapted to clamp the ridge member between the hooks and the display column. With this construction, each display column may be connected to and disconnected from the corresponding ridge member very quickly and easily simply by tightening or loosening the set screw mentioned.

An additional object is to provide means for quickly and easily connecting a display bracket to and disconnecting it from a display column of the invention. More particularly, an object in this connection is to provide: a column having a front surface and having a generally horizontal opening in one side thereof rearwardly of and paralleling the front surface; a forwardly extending bracket having a rear end carrying a transverse pivot pin insertable into the opening from one side of the column; a stop on the bracket seatable against the front surface of the column in response to the tendency of the bracket to pivot downwardly about the axis of the pivot pin under the influence of gravity; and a keeper on the stop and engageable with the opposite side of the column, when the stop is seated against the front surface of the column, to prevent withdrawal of the pivot pin from the opening. With this construction, the bracket can be removed very quickly and easily simply by pivoting it upwardly to disengage the keeper from the column, and then withdrawing the pivot pin. Installation of the bracket simply involves a reversal of this procedure.

The foregoing objects, advantages, features and results of the present invention, together with various other objects, advantages, features and results thereof which will be evident to those skilled in the art in the light of this disclosure may be achieved with the exemplary embodiments of the invention described in detail hereinafter and illustrated in the accompanying drawing.

DESCRIPTION OF DRAWING

In the drawing:

FIG. 1 is a perspective view showing a display rack assembly which embodies the invention;

FIG. 2 is an enlarged, fragmentary elevational view taken as indicated by the arrowed line 2—2 of FIG. 1;

FIG. 3 is a sectional view taken as indicated by the arrowed line 3—3 of FIG. 2;

FIG. 4 is a sectional view taken as indicated by the arrowed line 4—4 of FIG. 3;

FIG. 5 is a sectional view taken as indicated by the arrowed line 5—5 of FIG. 2;

FIG. 6 is a fragmentary plan view showing a lower pivot means for interconnecting two display racks of the invention;

FIG. 7 is a fragmentary sectional view taken as indicated by the arrowed line 7—7 of FIG. 1;

FIG. 8 is a fragmentary side elevational view showing a display column and bracket combination of the invention;

FIG. 9 is a sectional view taken as indicated by the arrowed line 9—9 of FIG. 8; and FIG. 10 is a schematic view of a display rack assembly constituting an extension of the assembly of FIG. 1.

DETAILED DESCRIPTION OF EXEMPLARY EMBODIMENTS OF INVENTION

Illustrated in FIG. 1 of the drawing is a display rack assembly 10 of the invention which includes a series of individual display racks 12, 14, etc., interconnected in end-to-end relation for relative pivotal movement about vertical axes in a manner to be described. Consequently, the display racks may be arranged in alignment, as shown in FIG. 1, at different angles relative to each other, or a combination of the two, depending on the size and shape of the space available for the display rack assembly 10.

Each display rack 12 and 14 is provided at one end thereof with an A-frame, the A-frame of the display rack 12 being designated generally by the numeral 16 and the A-frame of the display rack 14 being designated generally by the numeral 18. As suggested in FIG. 10, it will be understood that the first display rack 15 in the series constituting the display rack assembly 10 starts with a similar A-frame. In other words, the first display rack 15 in the series has A-frames 17 at both ends. (During assembly, the display rack 15 with two A-frames 17 is preferably set up first. Then, additional display racks are added, terminating with the display racks 14 and 12.)

Connected to the upper end of the A-frame 16 in a manner to be described is one end of a ridge member 20 which extends longitudinally of the display rack 12. Similarly, one end of a ridge member 22 is connected to the upper end of the A-frame 18 and extends longitudinally of the display rack 14. The adjacent ends of the two ridge members 20 and 22 are pivotally interconnected for relative movement about a vertical axis. As best shown in FIG. 2, this is accomplished simply by a pivot pin 24 dropped through aligned holes in the adjacent ends of the ridge members 20 and 22 so that these ridge members may be connected and disconnected readily. As FIG. 2 clearly shows, the adjacent ridge member ends provide a tongue and slot connection through which the pin 24 extends.

An important feature resides in the manner in which the A-frames 16 and 18 are connected to the ridge members 20 and 22. The interconnections are the same in both cases so that only the interconnection between the A-frame 18 and the ridge member 22 will be considered.

The A-frame 18 comprises two upwardly converging posts 26 provided at their upper ends with clamps 28 pivotally interconnected by a pin 30 below and paralleling the ridge member 22. The posts 26 are preferably tubes and the clamps 28 are simply plugged into the upper ends thereof. As will be apparent, with the foregoing construction, when the lower ends of the posts 26 are displaced toward each other, the clamps 28 open to receive the ridge member 22, or to permit its withdrawal from between the clamps. Thus, this provides a very quick and easy way of interconnecting the A-frame 18 and the ridge member 22, the same applying to the A-frame 16 and the ridge member 20.

The lower ends of posts 32 of the A-frame 16 are interconnected by a link 34 to maintain the desired spaced relation therebetween. As best shown in FIG. 7, the lower ends of the posts 32 are provided with plugs 36 which are simply inserted into complementary holes 38 in the ends of the link 34. Thus, this provides a quick and easy way of assembling and disassembling the posts 32 and the link 34. A link 40 is connected to the lower ends of the posts 26 of the A-frame 18 in the same way.

The display rack 12 includes two transversely spaced base members 42 which extend longitudinally of such rack and which are disposed on opposite sides of a vertical plane containing the axis of the ridge member 20. The display rack 14 includes similar base members 44. Each such base member is preferably an upwardly facing channel for a reason which will become apparent.

The base members 42 are attached to the link 34 by bolts equipped with wing nuts 46, FIG. 7, for quick and easy assembly and disassembly. The other ends of the base members 42 are connected to a plate 48 by bolts equipped with wing nuts 50, FIG. 6. Similarly, the base members 44 are connected to the link 40 by bolts equipped with wing nuts 52, these bolts also securing to the link 40 a plate 54 similar to the plate 48. The plates 48 and 54 are pivotally interconnected by a bolt equipped with a wing nut 56, this bolt being coaxial with the pivot pin 24. Alternatively, the plates 48 and 54 may be permanently pivotally interconnected, as by a rivet, not shown.

The foregoing structure interconnects the base members 42 and 44 for pivotal movement about a vertical axis coaxial with the axis of the pivot pin 24. Thus, the display racks 12 and 14 may be pivoted to each other to occupy aligned positions, or positions wherein they are angularly displaced to different degrees, depending on the size and shape of the space available for the display rack assembly. The use of the various wing nuts 46, 50 and, 52 and 56 facilitates assembly and disassembly of the display racks 12 and 14 and the various components thereof.

Each rack 12 and 14 includes one or more display columns on which paintings, or the like, may be hung. For example, the display rack 12 is shown as provided with two display columns 58 extending between one of the base members 42 and the ridge member 20. Since each base member 42 is laterally offset from the vertical plane of the ridge member 20, the display columns 58 are inclined so that paintings 60 hung therefrom rest against horizontal support rods 62 carried by and extending between the display columns. The paintings and the support rods may be carried by hooks 64 having hooked ends disposed in openings in the display columns.

In the foregoing, the various racks have been disclosed as including at least one A-frame each. However, by using two spaced racks with two A-frames each, the intervening rack does not require an A-frame, its ridge member being carried by the ridge members of the adjacent racks.

The lower end of each display column 58 is simply seated in one of the channel-shaped base members 42. An important feature of the invention resides in the manner in which the upper end of each display column 58 is secured to the corresponding ridge member, e.g., the ridge member 20. Referring to FIGS. 2 and 5, two spaced hooks 68, interconnected by a spacer 70, are hooked over the ridge member 20. The corresponding display column 58 is disposed between the two hooks 68, and is also disposed between the spacer 70 and the ridge member 20. A set screw 72 is threaded through the spacer 70 and bears against the display column 58. As will be apparent, tightening of the set screw 72 clamps the ridge member 20 between the display column 58 and the hooks 68 to positively secure the display column to the ridge member. This construction provides a quick and easy way of interconnecting and disconnecting each of the display columns 58 and the ridge member 20. At the same time, it provides an automatic adjustment for any variations in the spacing between the ridge member and the base member 42 in which the lower end of the display column 58 is seated.

Turning now to FIGS. 8 and 9, illustrated herein is a display column 74 similar to one of the display columns 58, except that it is provided with openings 76 in the sides thereof rearwardly of and parallel to a front surface 78 of the display column. A shelf bracket 70, or the like, carries a pin 82 which is insertable through a pair of the openings 76 from one side of the display column 74. The bracket 80 also carries a stop 84 which automatically seats itself against the front surface 78 of the display column 74 as the bracket 80 tends to rotate downwardly under the influence of gravity, about the axis of the pin 82. The stop 84 carries a keeper 86 which is engageable with the opposite side of the display column 74 from the side through which the pin 82 is inserted. Thus, when the stop 84 is in engagement with the front surface 78 of the display column 74, the bracket 80 cannot be inadvertently dislodged. However, it can be removed readily by tilting the bracket upwardly so that the keeper 86 clears the display column 74, whereupon the pin 82 may be withdrawn. The bracket 80 may be used alone, or in combination with a similar bracket on an adjacent display column, to support various articles for display purposes, as on a shelf. An important feature of the bracket 80 is that it requires no wall space for installation.

Although exemplary embodiments of the invention have been disclosed for purposes of illustration, it will be understood that various changes, modifications and substitutions may be incorporated in such embodiments without departing from the spirit of the invention as defined by the claims appearing hereinafter.

We claim as our invention:

1. In a display rack assembly, the combination of:
   a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
   b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
   c. an upper vertical pivot means connecting the other end of said first ridge member to said one end of said second ridge member;
   d. a lower vertical pivot means coaxial with said upper vertical pivot means and connecting the other ends of said first base members to the first mentioned ends of said second base members;
   e. said base members of each of said racks being disposed on opposite sides of a vertical plane containing the axis of said ridge member thereof;
   f. each of said racks including one or more display columns having lower ends connected to one of said base members thereof;
   g. means connecting the upper end of each of said display columns of each of said racks to said ridge member thereof; and
   h. said base members are upwardly facing channels, the lower end of each of said display columns is seated in one of said channels and said connecting means adjustably connects each of said columns to said ridge member, the adjustment being in a direction parallel to the longitudinal axis of said column and in a direction parallel to the longitudinal axis of said ridge member.

2. In a display rack assembly, the combination of:
   a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
   b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
   c. an upper vertical pivot means connecting the other end of said first ridge member to said one end of said second ridge member;
   d. a lower vertical pivot means coaxial with said upper vertical pivot means and connecting the other ends of said first base members to the first mentioned ends of said second base members;
   e. said base members of each of said racks being disposed on opposite sides of a vertical plane containing the axis of said ridge member thereof;
   f. each of said racks including one or more display columns having lower ends connected to one of said base members thereof;
   g. means connecting the upper end of each of said display columns of each of said racks to said ridge member thereof; and
   h. each of said display columns is connected to the corresponding one of said ridge members by a connecting means which includes
   two spaced hooks in hooked engagement with said ridge member;
   a spacer spaced from said ridge member and interconnecting said hooks;

said display column being disposed between said spacer and said ridge member and also being disposed between said hooks; and a set screw threaded through said spacer and bearing against said display column.

3. In a display rack assembly, the combination of:
a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
b. a second rack including a second A-frame comprising tow upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
c. an upper vertical pivot means connecting the other end of said first ridge member to said one end of said second ridge member;
d. a lower vertical pivot means coaxial with said upper vertical pivot means and connecting the other ends of said first base members to the first mentioned ends of said second base members;
e. said base members of each of said racks being disposed on opposite sides of a vertical plane containing the axis of said ridge member thereof;
f. each of said racks including one or more display columns having lower ends connected to one of said base members thereof;
g. means connecting the upper end of each of said display columns of each of said racks to said ridge member thereof; and
h. wherein the means connecting the upper end of one of said display columns to the ridge member comprises an element having two spaced hooks in hooked engagement with said ridge member and a spacer spaced from said ridge member and interconnecting said hooks, said column being disposed between said spacer and said ridge member and also being disposed between said hooks, and including a set screw threaded through said spacer and bearing against said column.

4. In a display rack assembly, the combination of:
a. a first rack incluidng a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
c. an upper vertical pivot means connecting the other end of said first ridge member to said one end of said second ridge member;
d. a lower vertical pivot means coaxial with said upper vertical pivot means and connecting the other ends of said first base members to the first mentioned ends of said second base members;
e. said base members of each of said racks being disposed on opposite sides of a vertical plane containing the axis of said ridge member thereof;
f. each of said racks including one or more display columns having lower ends connected to one of said base members thereof;
g. means connecting the upper end of each of said display columns of each of said racks to said ridge member thereof; and
h. wherein one of the columns has a front surface and a generally horizontal opening in one side thereof rearwardly of and paralleling said front surface, a forwardly extending bracket having a rear end carrying a transverse pivot pin insertable into said opening from said one side of said column, a stop on said bracket seatable against said front surface of said column in response to the tendency of said bracket to pivot downwardly about the axis of said pivot pin under the influence of gravity, and a keeper on said stop and engagable with the opposite side of said column when said stop is seated against said front surface of said column, to prevent withdrawal of said pivot pin from said opening.

5. In a display rack assembly, the combination of:
a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
c. an upper vertical pivot means connecting the other end of said first ridge member to said one end of said second ridge member;
d. a lower vertical pivot means coaxial with said upper vertical pivot means and connecting the other ends of said first base members to the first mentioned ends of said second base members;
e. said base members of each of said racks being disposed on opposite sides of a vertical plane containing the axis of said ridge member thereof;
f. each of said racks including one or more display columns having lower ends connected to one of said base members thereof;
g. means connecting the upper end of each of said display columns of each of said racks to said ridge member thereof; and
h. said lower vertical pivot includes first and second generally triangular plates pivotally connected to each other, said first plate being connected to the other ends of said first base members and said second plate being connected to the first mentioned ends of said second base members.

6. In a display rack assembly, the combination of:
a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
c. an upper vertical pivot means connecting the other end of said first ridge member to said one end of said second ridge member;
d. a lower vertical pivot means coaxial with said upper vertical pivot means and connecting the other ends of said first base members to the first mentioned ends of said second base members;
e. said base members of each of said racks being disposed on opposite sides of a vertical plane containing the axis of said ridge member thereof;
f. each of said racks including one or more display columns having lower ends connected to one of said base members thereof;
g. means connecting the upper end of each of said display columns of each of said racks to said ridge member thereof;
h. a clamp member having a plug at one end, a curved arm at the other end and an extending arm there between attached to each of said posts, said clamp member being connected to a post by said post receiving said plug;
i. said first posts are pivotally connected at their upper ends by virtue of a pivotal connection of said extending arms of the clamp members connected to each of said first posts; and
j. said second posts are pivotally connected at their upper ends by virtue of a pivotal connection of said extending arms of the clamp members connected to each of said second posts.

7. In a display rack assembly, the combination of:
a. a first rack including a first A-frame comprising two upwardly converging first posts and a first link interconnecting them adjacent their lower ends, a first longitudinally extending ridge member connected adjacent one end thereof to the upper ends of said first posts, and two laterally spaced, longitudinally extending first base members having ends connected to said first link;
b. a second rack including a second A-frame comprising two upwardly converging second posts and a second link interconnecting them adjacent their lower ends, a second longitudinally extending ridge member connected adjacent one end thereof to the upper ends of said second posts, and two laterally spaced, longitudinally extending second base members having ends connected to said second link;
c. an upper vertical pivot means connecting the other end of said first ridge member to said one end of said second member;
d. a lower vertical pivot means coaxial with said upper vertical pivot means and connecting the other ends of said first base members to the first mentioned ends of said second base members;
e. said base members of each of said racks being disposed on opposite sides of a vertical plane containing the axis of said ridge member thereof;
f. each of said racks including one or more display columns having lower ends connected to one of said base members thereof;
g. means connecting the upper end of each of said display columns of each of said racks to said ridge member thereof;
h. said links each have holes adjacent its end portions; and
i. a plurality of support plugs each having two differently dimensioned ends, a larger end received by a post and a smaller end received in a hole of a link and projecting therethrough for supporting said assembly.

8. A display rack as claimed in claim 7 wherein each of said links is connected to said base members at positions between said end portion holes.

* * * * *

PO-1050
(5/69)

UNITED STATES PATENT OFFICE
CERTIFICATE OF CORRECTION

Patent No. 3,805,966  Dated April 23, 1974

Inventor(s) Harold R. Wakeman and Laurence E. Hiney

It is certified that error appears in the above-identified patent and that said Letters Patent are hereby corrected as shown below:

Column 4, line 42, the word "and" (first occurrence) should be deleted. (page 9, line 19)

Column 5, line 20, "herein" should be --therein--. (page 11, line 7)

Column 5, line 24, "70" should be --80--. (page 11, line 11)

Column 7, line 16 (claim 3), "tow" should be --two--. (Claim 13, line 11 of amendment May 3, 1973)

Column 7, line 52 (claim 4), "incluidng" should be --including--. (claim 14, line 2 of amendment May 3, 1973)

Column 8, line 65 (claim 5), after the word "pivot" insert --means--.

Column 9, line 39 (claim 6), "there between" should be --therebetween--.

Signed and sealed this 22nd day of October 1974.

(SEAL)
Attest:

McCOY M. GIBSON JR.
Attesting Officer

C. MARSHALL DANN
Commissioner of Patents